United States Patent Office 3,250,631
Patented May 10, 1966

3,250,631
GLASS SEALING COMPOSITIONS AND METHOD FOR MODIFYING SAME
Kenneth G. Lusher, Perrysburg, Ohio, assignor to Owens-Illinois Company, a corporation of Ohio
No Drawing. Filed Dec. 26, 1962, Ser. No. 247,290
18 Claims. (Cl. 106—47)

This invention relates to glass sealing compositions and a method for modifying the same and, more particularly, to devitrifiable glass sealing compositions suitable for effectively sealing a glass surface to another surface including glass, metal, ceramic, and like surfaces, and to a process for modifying the expansion properties of the glass sealing composition to substantially correspond to those of the surfaces being sealed.

While glass surfaces may be sealed by applying sufficient heat to the adjoining surfaces to cause them to fuse together, the high temperatures which are necessary to achieve fusion create conditions detrimental to the glass in that they cause deformation as well as permanent stresses therein which may, at a later time, result in breakage, either spontaneously or when the glass is subjected to some form of physical or thermal shock.

Moreover, fusion sealing is not practical when delicate or sensitive materials are in relatively close proximity to the glass surfaces being joined, since the high temperatures adversely affect these materials. A specific example is in the assembly of cathode-ray tubes where a cathodoluminescent surface has been deposited on the face plate and a cathode-ray electronic gun has been assembled within the funnel portion of the tube. The peripheral edge of the face plate is then placed in juxtaposition with the peripheral edge of the funnel and the edges are sealed together. If the seal is formed by subjecting the adjoining glass surfaces to a temperature sufficient to fuse the glass, such as high temperature will adversely affect the cathodoluminescent surface, and will damage one or more of the sensitive elements comprising the electron gun.

Brazing or soldering glass compositions have been developed for sealing a glass surface to another glass, metal, ceramic, and like surfaces. Such compositions have a softening point which is considerably lower than the annealing temperature of the glass surface being sealed, so that the glass surface may be safely subjected to this lower temperature for a period of time sufficient to cause the solder glass to soften and flow into and fill the space between the surfaces to form a durable seal upon cooling of the parts.

The relationship of the glass sealing composition and the parent glass being sealed has to be such that the sealing composition can perform its sealing function with a minimum disturbance or alteration of the glass parts being sealed and without creating any detrimental stresses between the seal and the surfaces being sealed. The most satisfactory results are obtained when the coefficient of thermal expansion of the solder glass composition most nearly approximates the coefficient of thermal expansion of the surfaces being sealed.

Brazing or soldering glass compositions having extremely low softening temperatures far below the annealing temperature of the hard glass being sealed and devitrifiable over a transformation range wherein the sealing composition changes in character from a vitreous to a non-vitreous or crystalline material, are also known. Again, it is important in order to produce a satisfactory seal that the devitrified seal have substantially the same coefficient of thermal expansion as the glass surface which it is sealing. As can be appreciated, failure to follow this basic precaution results in an unsatisfactory seal with unwanted stresses occurring between the seal and the glass so that the bond therebetween will be adversely affected by the varying thermal conditions to which the seal and the glass component may be subjected.

Since the thermal coefficients of expansion of glasses will vary, as will those of metal surfaces and ceramic materials, with the particular compositions thereof, anyone wishing to join two surfaces having substantially the same expansion properties will have to use a solder glass having substantially the same expansion properties. This means that the one who performs the actual sealing step, such as an electronics manufacturer who makes a number of electronic components requiring the sealing of glass to glass, glass to metal, and glass to ceramic surfaces subsequent to assembling the components, has to keep a large inventory of solder glasses on hand. Furthermore, for sealing glasses having a coefficient of thermal expansion different from that of the solder glasses in the inventory, the manufacturer must either choose a solder glass having the nearest expansion characteristics or must attempt to obtain a solder glass having the specific thermal expansion properties from the glass supplier. Many times the manufacturer is unable to purchase the small amount of the particular solder glass he needs since it is impractical for the glass manufacturer or supplier to develop such a small amount of solder glass and, if he were to do so, the cost might be prohibitively high.

Accordingly, it is an object of this invention to provide a method for modifying the thermal expansion properties of glass sealing compositions to correspond substantially to the thermal expansion properties of the glass surface being sealed, without materially affecting any of the sealing properties of the compositions.

It is another object of this invention to provide a method for readily modifying the thermal expansion properties of thermally devitrifiable brazing or soldering glasses used for sealing a glass surface to another surface, thus obviating the necessity for maintaining a large inventory of solder glasses having different coefficients of thermal expansion to meet the particular and varied requirements of the surfaces being sealed.

A further object of this invention is to provide a solder glass composition having a coefficient of thermal expansion which is lower than that of a glass formed from the glass-forming ingredients in the composition.

It is still another object of this invention to provide a thermally devitrifiable solder glass composition having a coefficient of thermal expansion which is lower than that of a thermally devitrifiable glass formed from the glass-forming ingredients in the composition.

In attaining the objects of this invention, one feature resides in admixing with the solder glass composition an amount of an inert refractory material sufficient to lower the coefficient of thermal expansion of the solder glass to the desired value without affecting the sealing temperature, flow characteristics, or other sealing properties of the solder glass.

Another feature of this invention resides in admixing with a thermally devitrifiable solder glass composition an amount of an inert refractory metal oxide sufficient to materially lower the coefficient of thermal expansion of the devitrifiable solder glass without affecting the sealing temperature, flow characteristics, or other sealing properties of the glass during the sealing operation.

Other objects, features, and advantages will become more apparent from the following discussion of the invention.

It has been found that the thermal expansion properties of a thermally devitrifiable solder glass can be modified by adding thereto a sufficient amount of an inert refractory material, such as an inert refractory metal oxide, to lower the thermal coefficient of expansion of the solder glass to the desired, matching value without affecting the sealing temperature, flow characteristics, or other sealing properties of the solder glass. This result is unexpected since it is known that the addition of inert particles, present as impurities in a glass, tend to weaken the properties of the glass.

In a typical sealing operation, a sealing glass, such as a thermally devitrifiable sealing glass, is usually applied by flowing or brushing a slurry comprising the finely divided glass particles in an organic vehicle onto one or both of the surfaces to be sealed. The surfaces are then placed in contact with each other and subjected to a temperature sufficiently above the softening point of the sealing glass to cause it to flow and wet the sealing surfaces while volatizing the solvent. This temperature is considerably below the annealing temperature of the surfaces being sealed, and is maintained for a sufficient period of time to accomplish the desired devitrification and then cooled to room temperature.

While the invention will be discussed with reference to thermally devitrifiable sealing glasses used for sealing glass to glass surfaces, it is to be understood that the teachings of the invention are broad enough to encompass solder glasses in general, and include glass to metal, glass to ceramic, and like seals.

The following examples are merely illustrative of the invention and are not to be considered as limiting the scope of the invention in any manner.

EXAMPLE I

A thermally devitrifiable lead-zinc-borate solder glass was made by melting, in a platinum crucible maintained at a temperature of 1800° F. in an air atmosphere for one and one-half hours, a glass-forming composition containing 53.33 parts by weight lead silicate 266 parts by weight lead oxide, 36.7 parts of an anhydrous $B_2O_3$, and 51.35 parts by weight zinc oxide. The glass had the following composition expressed in percent by weight:

| | Percent |
|---|---|
| $SiO_2$ | 2.0 |
| ZnO | 12.83 |
| PbO | 76.22 |
| $B_2O_3$ | 8.95 |

The solder glass was ground to −140 mesh size and incorporated in a vehicle of 1½% nitrocellulose in amyl acetate in an amount of 10 grams of glass per gram of vehicle.

EXAMPLE II

Two solder glass compositions of the invention were made by incorporating into the slurry of Example I 2 percent and 5 percent by weight, respectively, of beta-eucryptite, based upon the weight of the solder glass. Beta-eucryptite is commercially available in flour form and has a negative coefficient of thermal expansion of approximately $-60 \times 10^{-7}$ per degree C. (0–300° C.).

EXAMPLE III

Two additional solder glasses of the present invention were made by incorporating into slurry of Example I 5% and 10% by weight, respectively, of crushed fused quartz, based upon the weight of the solder glass. The crushed fused quartz was of −270 mesh size and had a coefficient of thermal expansion of $5.5 \times 10^{-7}$ per degree C. (0–300° C.).

To measure the effect of the refractory oxides on the expansion properties of the thermally devitrifiable solder glass of Example I, each of the above five solder glasses were coated onto a hard glass surface in a layer of identical width and length and a thickness of ⅛ inch. The hard glass had a coefficient of thermal expansion of $90 \times 10^{-7}$ per degree C. (0–300° C.) and its composition, expressed in percent by weight was as follows: $SiO_2$—67.18%; $Al_2O_3$—3.5%; $Na_2O$—6.77%; $K_2O$—5.65%; CaO+MgO—0.26%; $LiO_2$—0.54%; PbO—0.78%; BaO—11.81%; Fe—1.07%; $O_2$ equiv.—0.45%; $Rb_2O$—1.7%; $Cs_2O$—0.16%; $Sb_2O_3$—0.58%; $As_2O_3$—0.13%; $Fe_2O_3$—0.046%; NiO—0.0071% and CoO—0.0007%.

The coated glasses were then placed into an oven and maintained at a temperature of 425° C. for one hour, during which the solder glass compositions were devitrified on the hard glass surfaces.

It is known that when a sealing glass contracts to a greater extent than does the hard reference glass to which it is sealed, the sealing glass exerts an inward pull or bending movement on the harder glass at the bonding of the seal. This indicates that the sealing glass is placed in a state of tension, i.e., tensional stresses are developed in the sealing glasses. Conversely, when the sealing glass undergoes a smaller total contraction than does the hard reference glass, the reference glass exerts a force on the sealing glass, i.e., placing the sealing glass in a state of compression.

By measuring the tension or compression forces in either the sealing glass or in the hard reference glass, by known methods using known apparatus, the relative effects of the different sealing glasses can be ascertained.

Table 1 shows the data obtained when the stresses, in pounds per square inch, in the hard reference glasses were measured.

*Table 1*

| Sample No. | Percent Beta-Eucryptite | Percent Fused Quartz | Firing Temp. and Time | Stress (p.s.i.) Reference Glass |
|---|---|---|---|---|
| 1 | 0 | 0 | 425° C.—1 hr | 547 Compression. |
| 2 | 2 | 0 | 425° C.—1 hr | 1,170 Tension. |
| 3 | 5 | 0 | 425° C.—1 hr | 1,900 Tension. |
| 4 | 0 | 5 | 425° C.—1 hr | 323 Tension. |
| 5 | 0 | 10 | 425° C.—1 hr | 1,600 Tension. |

From the above table, the increase in the stress values in terms of tensional stresses compared to the compressive stress obtained by use of the solder glass, per se, shows that the coefficient of thermal expansion of the solder glass is lowered by the addition of the inert refractory oxides.

Thus, by varying the amount of the refractory oxides in a known solder glass, the coefficient of expansion is changed accordingly. It has been noted that as low as ¼% by weight of beta-eucryptite lowers the expansion coefficient of the solder glasses and particularly of thermally devitrifiable lead-zinc-borate solder glasses coming within the formulation

| | Percent |
|---|---|
| PbO | 70–80 |
| ZnO | 7–16 |
| $B_2O_3$ | 7–10 |

Oxides such as BaO, CaO, CuO, $SiO_2$, $SnO_2$, $Bi_2O_3$, and similar fluxes, colorants, and the like, may be included in the solder glass.

However, any of the known solder glasses for sealing glass to glass, metal, ceramic, or like surfaces may be employed for purposes of the invention, including the thermally devitrifiable solder glasses. Since the refractory oxides are preferably added in comminuted form to the solder glass, the invention is best suited to the thermally devitrifiable solder glasses which are also in comminuted form prior to forming the fusion seal. Thus, the comminuted additive can readily be incorporated into the comminuted solder glass.

As is noted in Table 1, the amount of the refractory material which is present in the solder glass slurry will govern the effect obtained on the expansion characteristics of the solder glass. Thus, the amount of additive which is used will depend to a large extent on the particular solder glass and its expansion coefficient and on the expansion coefficient of the parent glass to which it will be sealed. Furthermore, as again evidenced by Table 1, the particular refractory used will influence the amount which is necessary in a particular situation.

While more than 10% by weight of the refractory materials can be used, and up to 20% or more by weight will provide good results, it has been noted that a point may be reached where too great an amount of a particular oxide in the solder glass begins to affect some of the sealing properties of the glass and particularly its ability to satisfactorily flow and wet the surfaces to be sealed.

While the parent glass of the above examples had an expansion coefficient of $90 \times 10^{-7}$ per degree C. (0–300° C.), the glasses which are sealed by known solder glasses have a coefficient of thermal expansion ranging from about $80 \times 10^{-7}$ to $120 \times 10^{-7}$ per degree C. (0–300° C.) and these glasses can be sealed together by choosing a solder glass having an expansion coefficient which is above that of the parent glass and adding to the solder glass an amount of a refractory oxide of the invention sufficient to decrease the expansion coefficient of the solder glass to match that of the parent glass. The solder glasses which can be modified in accordance with the present invention are those preferably having an expansion coefficient of from $80 \times 10^{-7}$ to $120 \times 10^{-7}$ per degree C. (0–300° C.).

While the refractory materials which can be used are the refractory metal oxides, it is important that such oxides have the property of being inert so as not to affect the low sealing temperatures or the flow characteristics of the solder glass. Included among the preferred refractory materials of the invention are beta-eucryptite and fused quartz, which effectively decrease the expansion of the solder glass. For purposes of this invention, $SiO_2$ will be considered as being included in the term refractory metal oxide, even though it is recognized that silicon is not a metal in most of its properties.

Furthermore, the best results are obtained when the inert refractory oxide has an expansion coefficient substantially lower than that of the solder glass, and preferably at least from $15 \times 10^{-7}$ to $25 \times 10^{-7}$ units lower. A number of satisfactory seals between glass surfaces have been made by using thermally devitrifiable solder glass modified by the addition thereto of a sufficient amount of inert refractory metal oxide to lower the expansion coefficient thereof to match that of the glass sealing surfaces. It was further noted that the strength of these seals was increased over those which did not contain the additive. Thus it may be preferable, when joining two glass surfaces together such as the glass face plate and glass funnel of a cathode-ray tube, to use a solder glass whose expansion characteristics have been modified in accordance with the present invention to match those of the glass surfaces, rather than to use an unmodified solder glass having the same coefficient as the surfaces, in order to obtain the increased strength.

As will be apparent to those having ordinary skill in this art, use of the inert refractory materials as additives to solder glasses for modifying the expansion characteristics of the solder glass will be of invaluable assistance in enabling the true matching of expansion characteristics of the sealing compositions with the glass surfaces being sealed, and will enable them to keep a smaller inventory of basic solder glasses which can subsequently be modified as desired.

Having thus fully described the invention, what is claimed is:

1. A thermally devitrifiable fusion-type glass sealing composition consisting essentially of a mixture of a comminuted thermally devitrifiable solder sealing glass having a high thermal coefficient of expansion and a comminuted inert refractory metal oxide having a coefficient of expansion lower than that of said solder sealing glass and of said glass sealing composition after devitrification of said composition, said refractory metal oxide being present in an amount sufficient to lower the coefficient of expansion of said solder sealing glass after devitrification to a desired level.

2. A thermally devitrifiable fusion-type glass sealing composition as defined in claim 1 wherein the coefficient of expansion of said refractory metal oxide is at least from about $15 \times 10^{-7}$ to $25 \times 10^{-7}$ per degree C. (0–300° C.) lower than the coefficient of expansion of said solder sealing glass composition after devitrification.

3. The thermally devitrifiable fusion-type glass sealing composition as defined in claim 1 wherein said refractory metal oxide is present in an amount of up to 20 percent by weight of said solder sealing glass.

4. The thermally devitrifiable fusion-type glass sealing composition as defined in claim 1 wherein said refractory metal oxide is present in an amount of up to 10 percent by weight of said solder sealing glass.

5. The thermally devitrifiable fusion-type glass sealing composition as defined in claim 1 wherein said refractory metal oxide is beta-eucryptite.

6. The thermally devitrifiable fusion-type glass sealing composition as defined in claim 1 wherein said refractory metal oxide is fused quartz.

7. A thermally devitrifiable fusion-type glass sealing composition consisting essentially of a mixture of a comminuted thermally devitrifiable lead-zinc-borate solder sealing glass having a high thermal coefficient of expansion and a comminuted inert refractory metal oxide having a coefficient of expansion lower than that of said solder sealing glass and of said glass sealing composition after devitrification of said composition, said refractory metal oxide being present in an amount sufficient to lower the coefficient of expansion of said solder sealing glass after devitrification to a desired level.

8. The thermally devitrifiable fusion-type glass sealing composition as defined in claim 7 wherein said solder sealing glass comprises the composition, by weight of PbO—70 to 80%; ZnO—7 to 16%; and $B_2O_3$—7 to 10%.

9. The thermally devitrifiable fusion-type glass sealing composition as defined in claim 8 wherein said inert refractory metal oxide is beta-eucryptite.

10. The thermally devitrifiable fusion-type glass sealing composition as defined in claim 8 wherein said inert refractory metal oxide is fused quartz.

11. In the method of sealing together a vitreous surface with another surface having substantially the same coefficient of thermal expansion with a thermally devitrifiable fusion-type solder glass having a coefficient of expansion higher than that of said surfaces including the steps of applying the solder glass to the surfaces to be joined, placing said surfaces in contact with each other and subjecting said surfaces and said solder glass to a temperature which is below the annealing temperature of said surfaces but is at least above the softening point of said solder glass whereby said solder glass flows and wets the surfaces to be sealed, and then cooling the solder glass to form a solid seal joining the vitreous surface to said other surface, wherein the difference in the thermal coefficients of expansion between the said surfaces and the solder glass will provide undesirable stresses to be formed at the sealing surfaces as the surfaces are subjected to varying thermal conditions, the improvement whereby the undesirable stresses are prevented from forming at the sealed surfaces, comprising admixing with said fusion-type solder glass composition prior to its application to the surfaces to be sealed an amount of an inert refractory material sufficient to lower the coefficient of thermal expansion of said solder glass to substantially that of the surfaces being sealed, the coefficient of expansion of said inert refractory material being lower than that of said fusion-type solder glass with which it is admixed and being lower than that of said solder glass composition after devitrification of said compositon.

12. The method as defined in claim 11 wherein said surfaces being sealed are vitreous surfaces.

13. The method as defined in claim 11 wherein said refractory material is an inert refractory metal oxide.

14. The method as defined in claim 13 wherein said inert refractory metal oxide is beta-eucryptite.

15. The method as defined in claim 13 wherein said inert refractory metal oxide is fused quartz.

16. The method as defined in claim 11 wherein said inert refractory material has a coefficient of thermal expansion which is at least from about $15 \times 10^{-7}$ to $25 \times 10^{-7}$ per degree C. (0–300° C.) lower than the expansion coefficient of said solder glass composition after devitrification.

17. The method as defined in claim 12 wherein said thermally devitrifiable solder glass is a lead-borate-zinc solder glass.

18. The method as defined in claim 17 wherein said solder glass comprises, by weight, PbO—70 to 80%; ZnO—7 to 16%; and $B_2O_3$—7 to 10%.

References Cited by the Examiner

UNITED STATES PATENTS

| | | | |
|---|---|---|---|
| 2,675,497 | 4/1934 | Meister et al. | 313—290 |
| 2,863,782 | 12/1958 | Eubank et al. | 106—47 |
| 2,889,952 | 6/1959 | Claypoole | 106—39 |
| 2,969,293 | 6/1961 | Smith | 106—49 |
| 3,037,828 | 6/1962 | Michael | 106—48 |
| 3,061,664 | 10/1962 | Kegg | 220—2.1 |

HELEN M. McCARTHY, *Acting Primary Examiner.*

TOBIAS E. LEVOW, *Examiner.*